(12) United States Patent
Dong

(10) Patent No.: US 8,589,460 B2
(45) Date of Patent: Nov. 19, 2013

(54) RANDOM NUMBER GENERATOR AND RANDOM NUMBER GENERATING METHOD THEREOF

(76) Inventor: Jiguo Dong, Tokyo (JP)

( * ) Notice: Subject to any disclaimer, the term of this patent is extended or adjusted under 35 U.S.C. 154(b) by 483 days.

(21) Appl. No.: 12/594,956

(22) PCT Filed: Nov. 13, 2008

(86) PCT No.: PCT/JP2008/071062
§ 371 (c)(1),
(2), (4) Date: Oct. 7, 2009

(87) PCT Pub. No.: WO2009/066709
PCT Pub. Date: May 28, 2009

(65) Prior Publication Data
US 2010/0235418 A1 Sep. 16, 2010

(30) Foreign Application Priority Data
Nov. 20, 2007 (JP) .................................. 2007-325253

(51) Int. Cl.
*G06F 1/02* (2006.01)
*G06F 7/58* (2006.01)

(52) U.S. Cl.
USPC ........................................................ 708/254

(58) Field of Classification Search
None
See application file for complete search history.

(56) References Cited

U.S. PATENT DOCUMENTS

| | | | |
|---|---|---|---|
| 6,014,445 A * | 1/2000 | Kohda et al. | 380/28 |
| 6,097,815 A | 8/2000 | Shimada | 380/46 |
| 6,263,146 B1 * | 7/2001 | Umeno et al. | 385/147 |
| 7,209,885 B1 * | 4/2007 | Shono et al. | 704/500 |
| 7,218,733 B2 * | 5/2007 | Li et al. | 380/28 |
| 2003/0091190 A1 * | 5/2003 | Okutomi | 380/263 |
| 2003/0219120 A1 * | 11/2003 | Kocarev et al. | 380/28 |

FOREIGN PATENT DOCUMENTS

| | | |
|---|---|---|
| JP | 2005228169 | 8/2005 |
| JP | 2006039998 | 2/2006 |
| WO | WO 03/104969 A2 | 12/2003 |

* cited by examiner

*Primary Examiner* — Henry Tsai
*Assistant Examiner* — Aurangzeb Hassan
(74) *Attorney, Agent, or Firm* — Che-Yang Chen; Law Office of Michael Chen

(57) ABSTRACT

A random number generator utilizes nonlinear function to obtain high generating speed, long cycle and great quality. By utilizing equation (1): $x_{t+1}=4x_t(1-x_t)$ to perform the steps of setting a binary integer having N bits (N≥2 and N is an integer) as an initial value; transforming a binary sequence having N bits into an integer of $2^m$ carry number having $[((N-1)/m)]+1$ digits (m≥1 and m is an integer; inputting to a chaos computing unit having calculating precision with N bits and calculation result with 2N bits; utilizing the chaos computing unit to generate a binary sequence $d(d_0 d_1 \ldots d_{2N-1})$ with 2N bits; and setting fore-N bits of a result with 2N bits $d(d_0 d_1 \ldots d_{2N-1})$ as the input value $a(a_0 a_1 \ldots a_{N-1})$ required for a repetitive calculation wherein a one-to-one excluding logical calculation $(r_i=d_i \oplus d_{i+N})$ is performed between $d_i$ and $d_{i+N}$, (i=0, 1, ... N−1) and can obtain a result characterized in that outputting the random number $r(r_0 r_1 \ldots r_{n-1})$.

2 Claims, 16 Drawing Sheets

| computing precision N (bit) | 32 | 64 | 96 | 128 | 160 | 192 | 224 | 256 |
|---|---|---|---|---|---|---|---|---|
| function computing speed (×10⁶times/sec) | 58 | 16 | 7.4 | 4.4 | 3.2 | 2.2 | 1.6 | 1.2 |

(Genuine Intel (R) CPU 1.5GHz 0.99GB RAM)

FIG. 2

|   | $a_0$ | $a_1$ | ... | $a_{N-1}$ |
|---|---|---|---|---|
| × | $b_0$ | $b_1$ | ... | $b_{N-1}$ |
|   | $a_0b_0$ | $a_1b_0$ | ... | $a_{N-1}b_0$ |
|   | $a_0b_1$ | $a_1b_1$ | ... | $a_{N-1}b_1$ |
|   | ... | ... | ... | ... |
|   | $a_0b_{N-1}$ | $a_1b_{N-1}$ | ... | $a_{N-1}b_{N-1}$ |
| + | $c_0$ $c_1$ ... $c_N$ $c_{N+1}$ ... $c_{2N-1}$ | | | |

FIG. 3

|  | n1 | n2 | n3 | n4 | nA1 | nA2 | nA3 | nA4 |
|---|---|---|---|---|---|---|---|---|
| $C < \mu - 2\sigma$ | 18 | 33 | 30 | 21 | 22 | 26 | 24 | 18 |
| $C > \mu + 2\sigma$ | 19 | 23 | 17 | 23 | 15 | 24 | 22 | 31 |
| $\mu - 2\sigma \leqq C \leqq \mu + 2\sigma$ | 963 | 944 | 953 | 956 | 963 | 950 | 954 | 951 |

FIG. 15

| computing precision N (bit) | 32 | 64 | 96 | 128 | 160 | 192 | 224 | 256 |
|---|---|---|---|---|---|---|---|---|
| generating speed of random number (Gbps) | 1.86 | 1.02 | 0.71 | 0.56 | 0.51 | 0.42 | 0.36 | 0.31 |

(Genuine Intel (R) CPU 1.5GHz 0.99 GB RAM)

FIG. 16

RANDOM NUMBER GENERATOR AND RANDOM NUMBER GENERATING METHOD THEREOF

FIELD OF THE INVENTION

The present invention relates to a random number generator and a random number generating method thereof.

BACKGROUND OF THE INVENTION

Random number has been widely used in various fields, such as computer simulation, sampling, numerical analysis, programming, decision making, encryption, art, entertainment and so on. Therefore, scholars and experts propose various methods for generating random numbers. Owing to high-speed development of the computer, random number generators and random number generating methods are required to meet the needs correspondingly.

Besides, chaos is an expected area for people because it can be simply constituted to generate sequences having various complex variations. Since Von Neumann proposes equation (1) to generate random numbers, many scholars deliver their research report utilizing the equation (1) to generating random numbers.

$$x_{t+1} = 4x_t(1-x_t)$$

$$(0 < x_t < 1,\ t=0,1,2,\ldots)\quad\text{Equation (1)}$$

Reference 1: Ulam, S. M. and Von Neumann, J., "On Combination of Stochastic Deterministic Processes", Bull, AMS, Vol. 53, p. 1120 (1947).

The reference proposes utilizing equation (1) to generate random numbers.

Reference 2: T. Kohda and A. Kakimoto "Pseudo-random number and chaos", Vol. 27 No. 3 pp. 289-296 (1986).

In reference 2, the threshold value is set to equal 0.5, utilizing equation (1) to generate random numbers can obtain a result with good quality. However, it can output a random number with one bit at one time. It still has disadvantages such as low random number generating speed.

Reference 3: Phatak, S. C. and Rao, S. S., "Logistic map: A Possible Random number Generator", Phys. Rev. E, Vol. 51 No. 4, pp. 3670-3678 (1995).

The reference 3 discloses that utilizing equation (1) can transform x, sequence with U-shaped distribution into uniform sequence. However, the fore-bits and back-bits of transformed sequence are highly related. Utilizing intervals sampling method can decrease the relation. The intervals have to be selected a greater value in order to pass the statistic test.

Reference 4: K. Shono "Chaos engineering", Springer-Verlag Tokyo, Tokyo, 2002.

The reference 4 discloses that utilizing fixed decimal point method implemented in hardware circuit for generating random numbers quickly is effective.

Reference 5: Japanese Invention Patent Application Number 2005-228169.

The reference 5 proposes a method to utilize fixed decimal point method to calculate equation (1) to expand the calculating precision.

These representative references described above disclose methods utilizing equation (1) to generate random numbers. These methods still have problems including the generated random numbers cannot meet several needs required in the practical field at the same time such as cycle (long cycle), quality (disorder in statistics), generating speed and etc.

SUMMARY OF THE INVENTION

Problems Need to be Solved

The objective of the present invention is to provide a random number generator and a random number generating method both can be adapted to general computers and hardware circuits and utilize equation (1) to generate random numbers and can have many advantages such as high random number generating speed, long cycle, and great quality in practical application.

Means for Solving Problems

The present invention (claim 1) relates to a random number generator, comprising:

an initial value input unit setting a binary integer having N bits (N≥2 and N is an integer) as an initial value;

an initial value transformation unit transforming a binary sequence having N bits into an integer of $2^m$ carry number having $[((N-1)/m)]+1$ digits (m≥1 and m is an integer; [ ] means rounding part being after decimal point down) to utilize equation (1) for carrying out fixed decimal point calculation;

a register used for saving data transformed from the initial value transformation unit and saving input data required for a repetitive calculation of a chaos computer with calculating precision of N bits;

a chaos computing unit setting the integer of $2^m$ carry number having $[((N-1)/m)]+1$ digits as an input value to perform an integer division calculation and have a calculation result with 2N bits;

a mixing output unit utilizing fore-N bits of the calculation result with 2N bits of the chaos computing unit as an input value required for a repetitive calculation of the equation (1) and saved in the register and process one-to-one excluding logical calculation in predetermined bits of the calculation result with 2N bits and utilize result with N bits as an output random number;

a random number register used for saving the random number with N bits outputted from the mixing output unit; and a control unit for generating random number used for controlling the initial value transformation unit, the chaos computing unit and the mixing output unit to generate the random number;

wherein influenced bits of a binary sequence d ($d_0 d_1 \ldots d_{2N-1}$) with 2N bits as a calculation result of an input value a ($a_0 a_1 \ldots a_{N-1}$) of the chaos computing unit are different in calculating process of the chaos computing unit and have non-uniform distribution characteristic; the mixing output unit performs one-to-one excluding logical calculation and XOR calculation in predetermined bits of the d ($d_0 d_1 \ldots d_{2N-1}$) to generate random number $r_i$ (i=0, 1, … N−1); each bit of the random number $r_i$ (i=0, 1, … N−1) is influenced by the input value a in different form; in the d ($d_0 d_1 \ldots d_{2N-1}$) between $d_i$ and $d_{i+N}$ (i=0, 1, … N−1) one-to-one excluding logical calculation ($r_i = d_i \oplus d_{i+N}$) is performed.

Besides, the present invention (claim 2) relates to a random number generating method, a generating random number according to equation (1): $x_{t+1} = 4x_t(1-x_t)$ comprising:

setting a binary integer having N bits (N≥2 and N is an integer) as an initial value;

transforming a binary sequence having N bits into an integer of $2^m$ carry number having $[((N-1)/m)]+1$ digits ($m \geq 1$ and m is an integer; [ ] means rounding part being after decimal point down);

inputting to a chaos computing unit having calculating precision with N bits and calculation result with 2N bits;

utilizing the chaos computing unit to use the equation (1) for an input value a ($a_0 a_1 \ldots a_{N-1}$) to perform fixed decimal point calculation to generate a binary sequence d ($d_0 d_1 \ldots d_{2N-1}$) with 2N bits; the chaos computing unit means a computer having 2m bits calculating capability (calculating capability including multiplication, addition, shift, and logical calculation capability between bits); the chaos computing unit utilizing an integer with N bits to divide into the integer of $2^m$ carry number having $[((N-1)/m)]+1$ digits and utilize the equation (1) to perform integer division calculation; and setting fore-N bits of a result with 2N bits d ($d_0 d_1 \ldots d_{2N-1}$) calculated by the chaos computing unit as the input value a ($a_0 a_1 \ldots a_{N-1}$) required for a repetitive calculation of the equation (1);

wherein influenced bits of the binary sequence d ($d_0 d_1 \ldots d_{2N-1}$) with 2N bits as a calculation result of an input value a ($a_0 a_1 \ldots a_{N-1}$) of the chaos computing unit are different in calculating process of the chaos computing unit and have non-uniform distribution characteristic, each bit of the d ($d_0 d_1 \ldots d_{2N-1}$) with 2N bits performs one-to-one excluding logical calculation between predetermined bits to generate the random number with N bits r ($r_0 r_1 \ldots r_{N-1}$); and wherein the chaos computing unit performs one-to-one excluding logical calculation and XOR calculation in predetermined bits of the d ($d_0 d_1 \ldots d_{2N-1}$) to generate random number $r_i$ ($i=0, 1, \ldots N-1$); each bit of the random number $r_i$ ($i=0, 1, \ldots N-1$) is influenced by the input value a in different form; in the d($d_0 d_1 \ldots d_{2N-1}$), between $d_i$ and $d_{i+N}$, ($i=0, 1, \ldots N-1$), one-to-one excluding logical calculation ($r_i = d_i \oplus d_{i \oplus i+N}$) is performed.

Effect of the Present Invention

1. The present invention utilizes fixed decimal point method to calculate equation (1). Therefore, it can calculate more quickly and reasonably than utilizing float decimal point method to calculate.

2. When the present invention utilizes fixed decimal point method to calculate equation (1), the chaos computing unit can perform best division calculating and can make equation (1) be easily expanded and can generate a chaos sequence having a longer cycle.

3. The mixing method of the present invention can generate a binary random number with bits equaling to computing precision and transform the chaos sequence having U-shaped distribution into a uniformly distributed binary random number.

4. The present invention can utilize a simplified process to obtain a random number generator adapted to various computing systems and can be easy to improve the computing precision and can generate a result having high speed, long cycle and great quality in statistics. This kind of industry technique is expected in its simplified process, performance and low cost.

BRIEF DESCRIPTION OF THE DRAWINGS

FIG. 2 is a chart to show relation between computing precision and function computing speed while m=32 in accordance with the present invention;

FIG. 3 is an equation to show integer with N bits (c=ab) while being expanded to a binary number in accordance with the present invention;

FIG. 15 is a graph to show result of serial correlation test in accordance with the present invention; and FIG. 16 is a chart to show relation between computing precision and random number generating speed while m=32 in accordance with the present invention.

Figure 1:
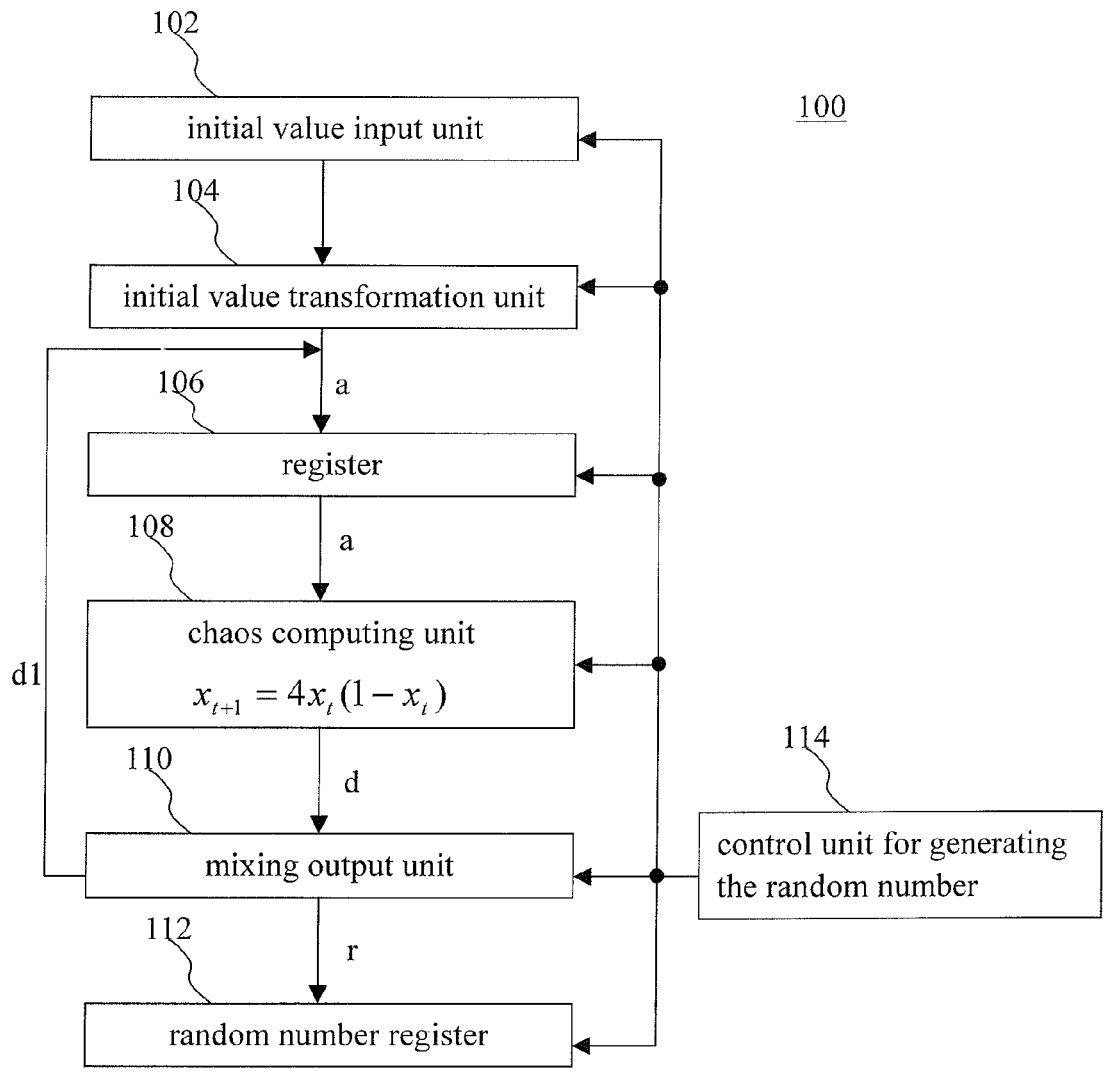
FIG. 1 is a block diagram to show components of a random number generator in accordance with the present invention.

DESCRIPTION OF NUMBERS IN THE DRAWINGS 100 random number generator
102 initial value input unit
104 initial value transformation unit
106 register
108 chaos computing unit
110 mixing output unit
112 random number register
114 control unit for generating random number

DETAILED DESCRIPTION OF THE INVENTION

The embodiment and effect of the present invention are described as below referring to drawings. The random number generator and the random number generating method in the present invention take advantage of an effective calculating method and mixing method.

FIG. 1 is an embodiment to show constitution of the random number generator in accordance with the present invention. The random number generator 100 is adapted to a binary sequence with N bits and utilize a chaos computing unit having 2m ($m \geq 1$ and m is an integer) bits calculating capability to perform repetitive calculating. The random number generator 100 is used for excluding logical calculation between fore-N bits and back-N bits of a result with 2N bits generated after each calculating of the chaos computing unit in order to generate a binary random number sequence with good quality and long cycle in high speed. The random number generator 100 includes an initial value input unit 102, an initial value transformation unit 104, a register 106, a chaos computing unit 108, a mixing output unit 110, a random number register 112 and a control unit for generating the random number 114.

The initial value input unit 102 receives the part being after decimal point of the inputted binary sequence with N bits used for performing fixed decimal point. We utilize a fixed decimal point calculation method to calculate equation (1) in order to obtain a better efficiency than utilizing a float decimal point calculation method. In general, scientific calculating with high precision often adopts the float decimal point calculation method. However, when utilizing the float decimal point calculation method (symbol=1 bit; index number=11 bits; value portion=52 bits) to calculate equation (1), we can observe that the used index portion is not beyond six bits. Thus it is so apparent whether calculating in hardware or software, utilizing the fixed decimal point calculation method to calculate equation (1) is more reasonable and effective.

The initial value transformation unit 104 transforms a binary sequence with N bits into an integer of $2^m$ carry number having $[((N-1)/m)]+1$ digits (for example, N=128 bits m=32 bits) in order to prepare for utilizing fixed decimal point calculation method to calculate equation (1). Utilizing an integral calculating to calculate equation (1) by the fixed decimal point calculation method can obtain a higher computing speed and an easier expansion of the computing precision. When utilizing a binary computer to calculate equation (1) by the fixed decimal point calculation method with N-bits calculating precision, the value of $x_t$ varies in the divergent interval ($\frac{1}{2}^N$, $1\frac{1}{2}^N$). Therefore, with respect to computing system of 2m bits (such as 64 bits), it can be easy to perform an integral calculating for equation (1) when the computing precision is below m (such as 32 bits). Because multiplication and addition of integral calculating can be easy to expand the precision by division calculating, utilizing integer to perform the fixed decimal point calculation method for equation (1) can easily expand the calculating precision.

The register 106 is used for saving input integer of $2^m$ carry number having $[((N-1)/m)]+1$ digits required for a repetitive calculation of a chaos computer. Referring to FIG. 2, expansion of the computing precision can make the calculating speed of equation (1) lower rapidly. Therefore, it is necessary to achieve that performing one time can generate random number with more bits. Besides, we know how to utilizing a binary sequence with constant length for calculating of bits (such as shift, replacement and logical calculation) to obtain a more complicate sequence. However, the problem also exists that repetitive calculating for generating random number repeated more times can take more time.

The chaos computing unit 108 setting the integer of $2^m$ carry number having $[((N-1)/m)]+1$ digits as an input value to process integral calculating for equation (1). The calculating of the integer of $2^m$ carry number having $[((N-1)/m)]+1$ digits has the same principles as the decimal system so we neglect the related explanation.

The mixing output unit 110 utilizes fore-N bits (d1) of the calculation result with 2N bits (d) of the chaos computing unit 108 as an input value required for a repetitive calculation of the equation (1) and saved in the register 106 and process a one-to-one excluding logical calculation in predetermined bits (between $d_i$ and $d_{i+N}$ (i=0, 1, ... N−1)) of the calculation result with 2N bits and utilize result with N bits as output random number $r(r_0 r_1 \ldots r_{N-1})$. The mixing method the present proposes has a sequence (d) with 2N bits and with apparently non-uniform distribution. By only processing one-to-one excluding logical calculation in predetermined bits, it can generate a random number sequence with uniform distribution and the same calculating precision.

Utilizing integral calculating for equation (1) to expand to a calculating of a binary number and observe it and can infer the mixing method proposed in the present invention. Set the part being after decimal point of a decimal x, with N bits as an integer a $(a_0 a_1 \ldots a_{N-1})$ with N bits. Thus, $x_t$=0.a. Set the part being after decimal point of a decimal $1-x_t$ as an integer b $(b_0 b_1 \ldots b_{N-1})$ with N bits. Therefore, $1-x_t$=0.b. The integer a and the integer b are complementary. Here, set c=ab, d=4c (c, d are integers with 2N bits), so d=4ab becomes a form of integral calculating of equation (1). The fore-N bits of d ($d_0 d_1 \ldots d_{2N-1}$) are the part being after decimal point of $x_{t+1}$.

Set the fore-N bits of d as an integer with N bits d1 and set the back-N bits of d as an integer with N bits d2. Thus, $x_{t+1}$=0.d1. Set integers a, b, c, d to expand to binary numbers. When each bit is $(a_0 a_1 \ldots a_{N-1})$, $(b_0 b_1 \ldots b_{N-1})$, $(c_0 c_1 \ldots c_{2N-1})$, and $(d_0 d_1 \ldots d_{2N-1})$, we can investigate the calculating process and result of c=ab, d=4c. Because the multiplication of the integer 4 in d=4c can be accomplished by shifting leftward. We can investigate the calculating process and result of c=ab (two binary integers with N bits a, b).

Referring to FIG. 3, set c=ab to expand to a binary number. We can know the relation between each bit $c_i$ of c and each bit of a and b can be shown in equation (2).

$$c_i = \begin{cases} 0 + k_{ci} & (i = 0) \\ \sum_{j=1}^{i}(b_{i-j}a_{j-1}) + k_{ci} & (1 \leq i \leq N) \\ \sum_{j=i}^{2N-1}(b_{j-1-(N-1)}a_{i-j+(N-1)}) + k_{ci} & (N < i \leq 2N - 1) \end{cases} \quad \text{Equation (2)}$$

($k_{ci}$ is carried from $c_{i+1}$, while i=2N+1, $k_{ci}$=0)

Utilizing $c_i$ to be shown by inputting the function of a to obtain equation (3).

$$c_i = \quad \text{Equation (3)}$$

$$\begin{cases} f_i() & (i = 0) \\ f_i(a_0, \ldots, a_{i-1}) = f_i(a_0 \sim a_{i-1}) & (1 \leq i \leq N - 1) \\ f_i(a_{N-1}, \ldots, a_{i-N}) = f_i(a_{N-1} \sim a_{i-N}) & (N \leq i \leq 2N - 1) \end{cases}$$

The number of each bit of a in $c_i$, as complexity of each bit, can be shown in $s_{ci}$. The complexity of each bit of c can be shown in equation (4).

$$s_{ci} = \begin{cases} i & (0 \leq i \leq N - 1) \\ 2N - i & (N \leq i \leq 2N - 1) \end{cases} \quad \text{Equation (4)}$$

Because d=4c, each bit of d can be expressed in equation (5). While shifting leftward, the bit from the most left position shifts to the most right position.

$$d_i = \begin{cases} c_{i+2} & (0 \leq i \leq 2N - 3) \\ c_{i-2N+2} & (2N - 2 \leq i \leq 2N - 1) \end{cases} \quad \text{Equation (5)}$$

According to investigations described above, it is apparent that the goal is each bit for generating a binary sequence having the highest complexity. The mixing method proposed in the present invention is utilizing equation (6) to generate a binary sequence r. Each bit of r has a complexity s. The complexity $s_{ri}$ is N (bits of computing precision).

$$r = d1 \oplus d2$$
$$= (d_0 \oplus d_N)(d_1 \oplus d_{N+1}) \ldots (d_{N-1} \oplus d_{2N-1})$$

Equation (6)

$\oplus$ means excluding logical calculation (XOR).

Figure 4:
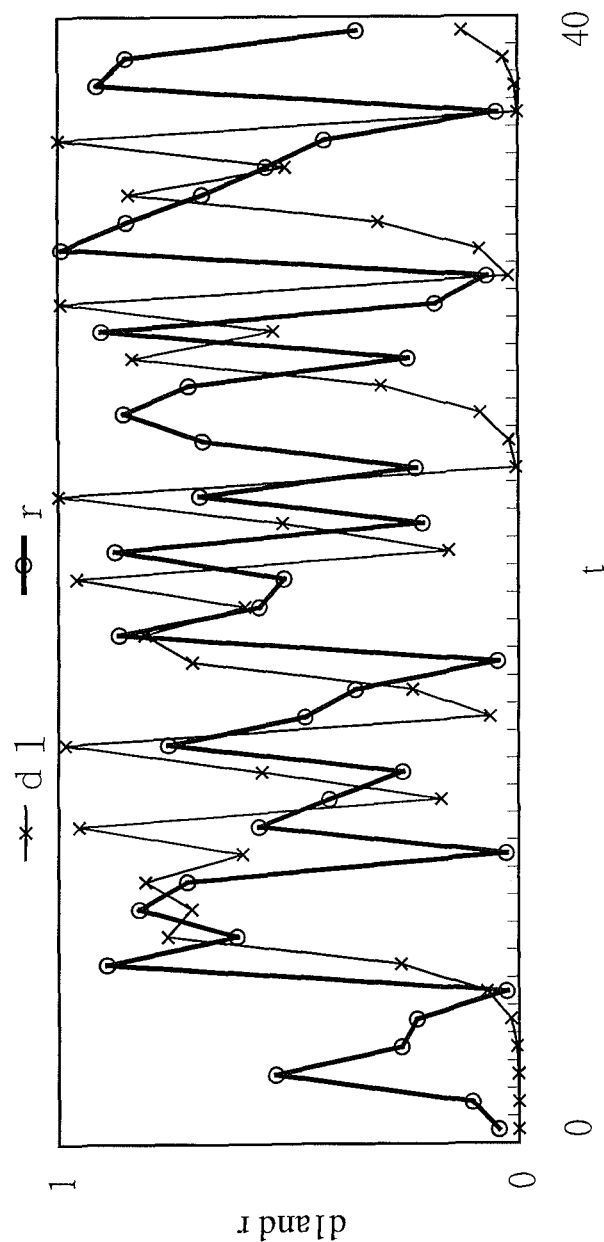
FIG. 4 is a comparison diagram to show d1 and r in accordance with the present invention.
Figure 5:
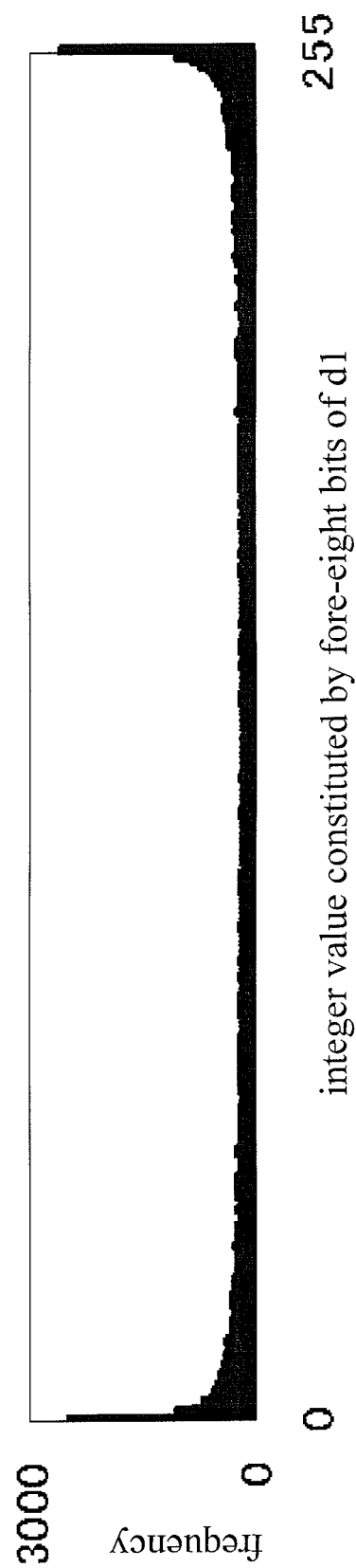
FIG. 5 is a distribution diagram to show the relation between frequency and fore-eight bits of d1 in accordance with the present invention.
Figure 6:
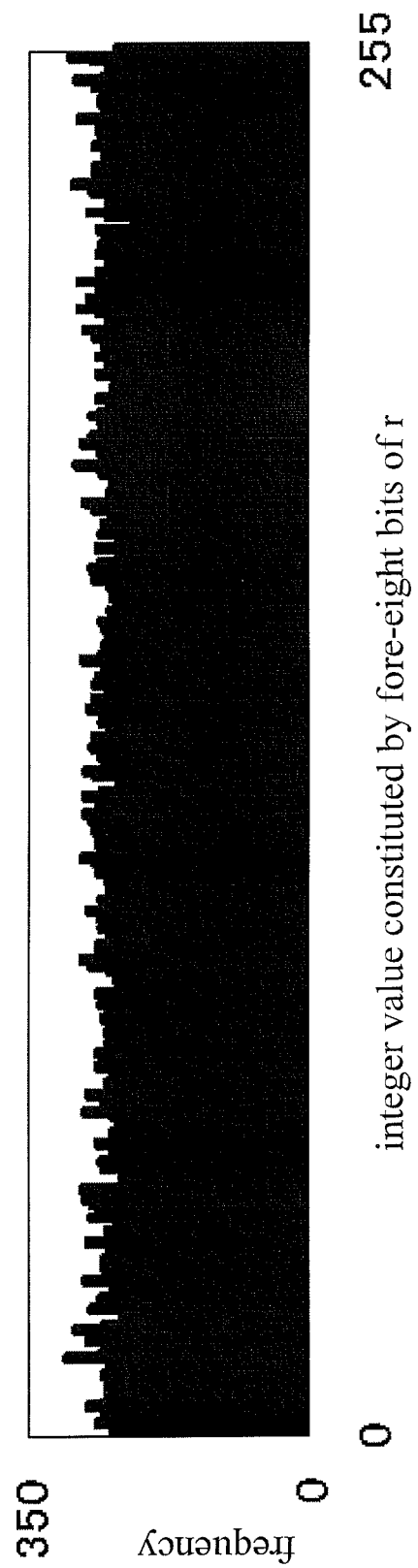
FIG. 6 is a distribution diagram to show the relation between frequency and fore-eight bits of r in accordance with the present invention.

The effect of equation (6) as a mixing method can be explained by utilizing FIGS. 4, 5, 6 and 7. FIG. 4 is a locus diagram to show d1 and r while utilizing the fixed decimal point calculation method (128 bits) to perform equation (1) (Transform d1 and r as the part being after decimal point performed by the fixed decimal point calculation method into a value between 0 and 1). The locus of d1 is chaotic and dynamic according to equation (1). When r closes to 0, it shows monotonously increasing rule. However, in the locus of r cannot be found this rule. There is none rule or relation can be seen between d1 and r. FIG. 5 is a distribution diagram to show the relation between frequency and fore-eight bits of d1 in accordance with the present invention. FIG. 6 is a distribution diagram to show the relation between frequency and fore-eight bits of r in accordance with the present invention. The samples are 65536. The distribution of d1 is approximately U-shaped. The distribution of r is approximately uniform. The result of statistic test for r can be described as below.

Figure 7:
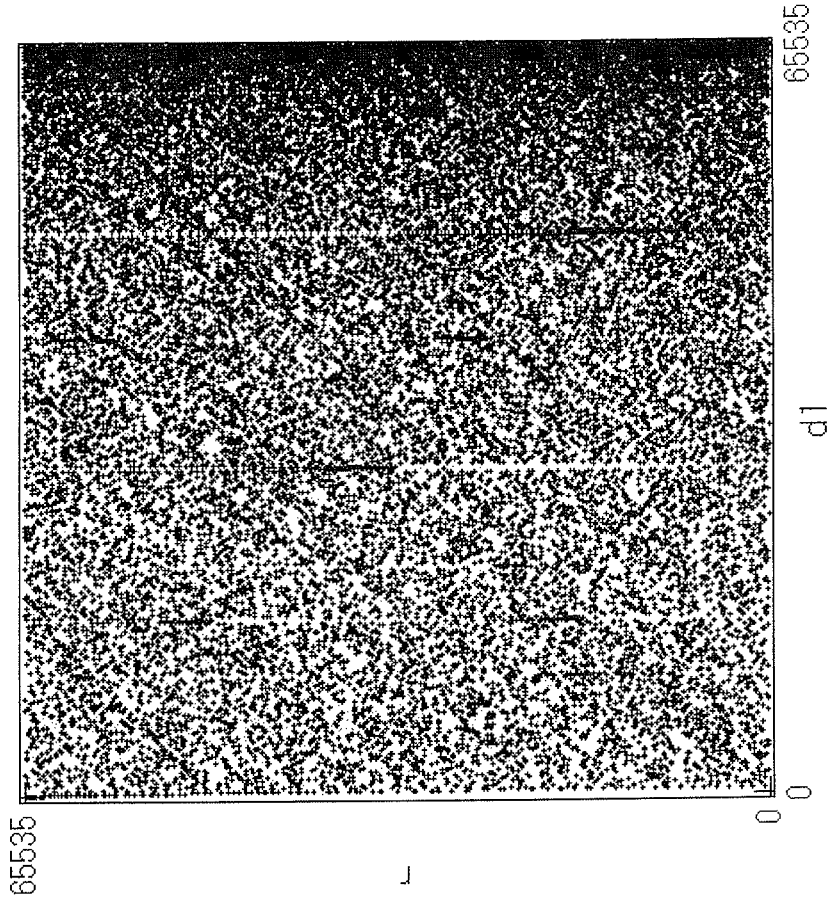
FIG. 7 is a diagram to show the relation between r and d1 in accordance with the present invention.

Because the output random number r with N bits can be generated by equation (6), it may have certain relation between r and d1. If there is linear relation between r and d1, r can infer d1. That is why from a certain binary sequence can infer other binary sequence. Thus, with respect to the corresponding relation between r and d1, it has to be recognized in bitmap figure. Because we cannot utilize high precision (such as 128 bits) to calculate to show the corresponding relation between r and d1, we utilize computing precision (16 bits) to observe the corresponding relation of r and d1. FIG. 7 is a diagram to show the relation between r and d1 in accordance with the present invention. In FIG. 7, r is x axis and d1 is y axis. FIG. 7 is all possible relation between r and d1 when the computing precision is 16 bits. Further, because equation (1) is symmetrical, we utilize input value a (1-32767) to calculate, we obtain a result that d1 has 28671 values and r has 32767 values. Referring to FIG. 7, we can see that the distribution of d1 calculated from the input value a is not uniform. With respect to the non-uniform distribution of the d1, the distribution of r is uniform between 1 to 65535. Thus, by the mixing method in equation (6), non-uniform distribution of d1 transforms into uniform distribution of random number r. There is no linear relation between r and d1. On the basis of the result described above, utilizing equation (1) to calculate can obtain a non-uniform $x_t$ (d1) sequence and utilizing the equation (6) to mix can obtain a uniform distribution of random number r. From the investigation of the equation (6) for confirming its effect, it can conclude that the mixing method proposed in present invention is effective.

Figure 8:
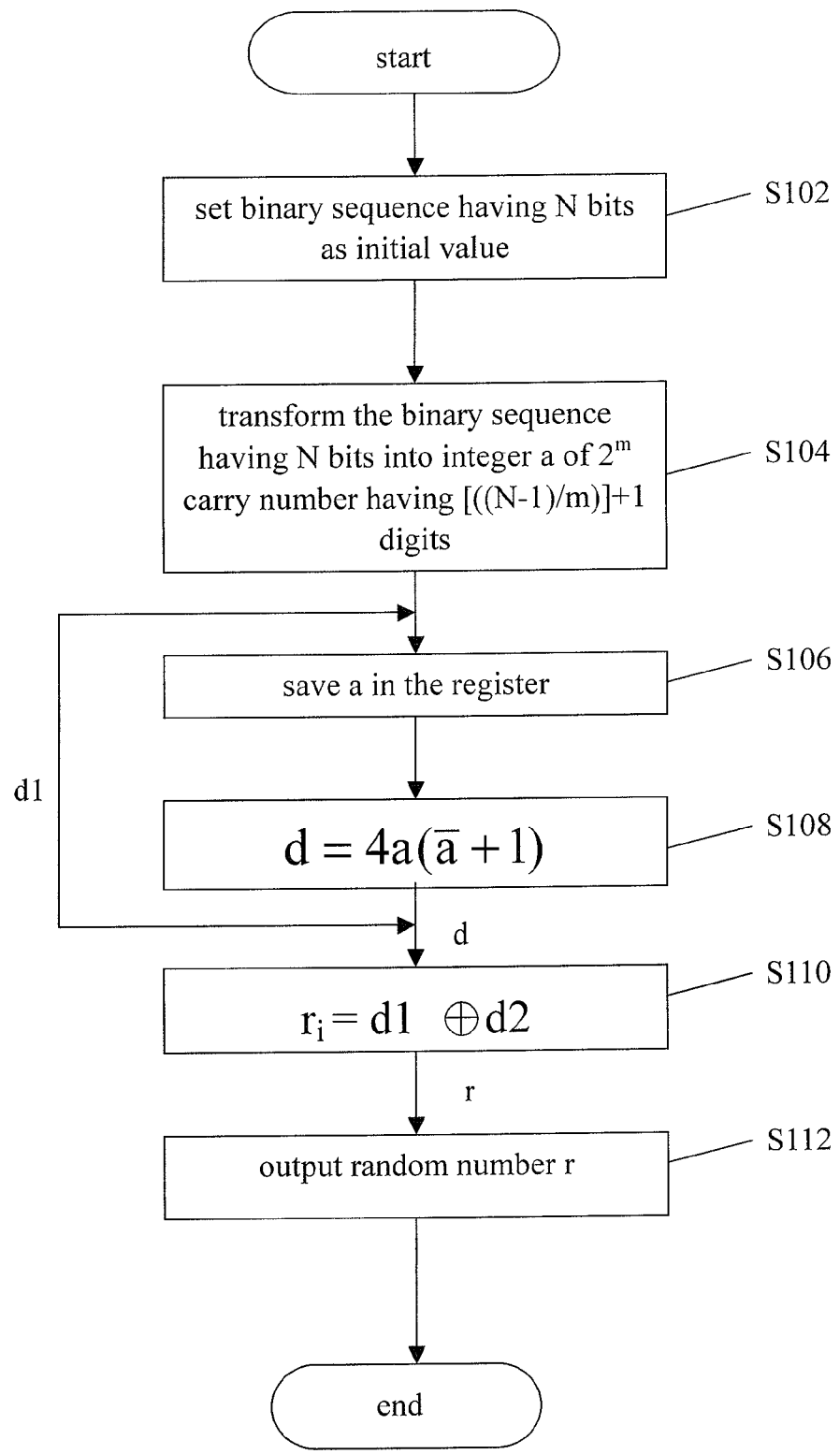
FIG. 8 is a flowchart to show operation of the random number generator in accordance with the present invention.
Figure 9:
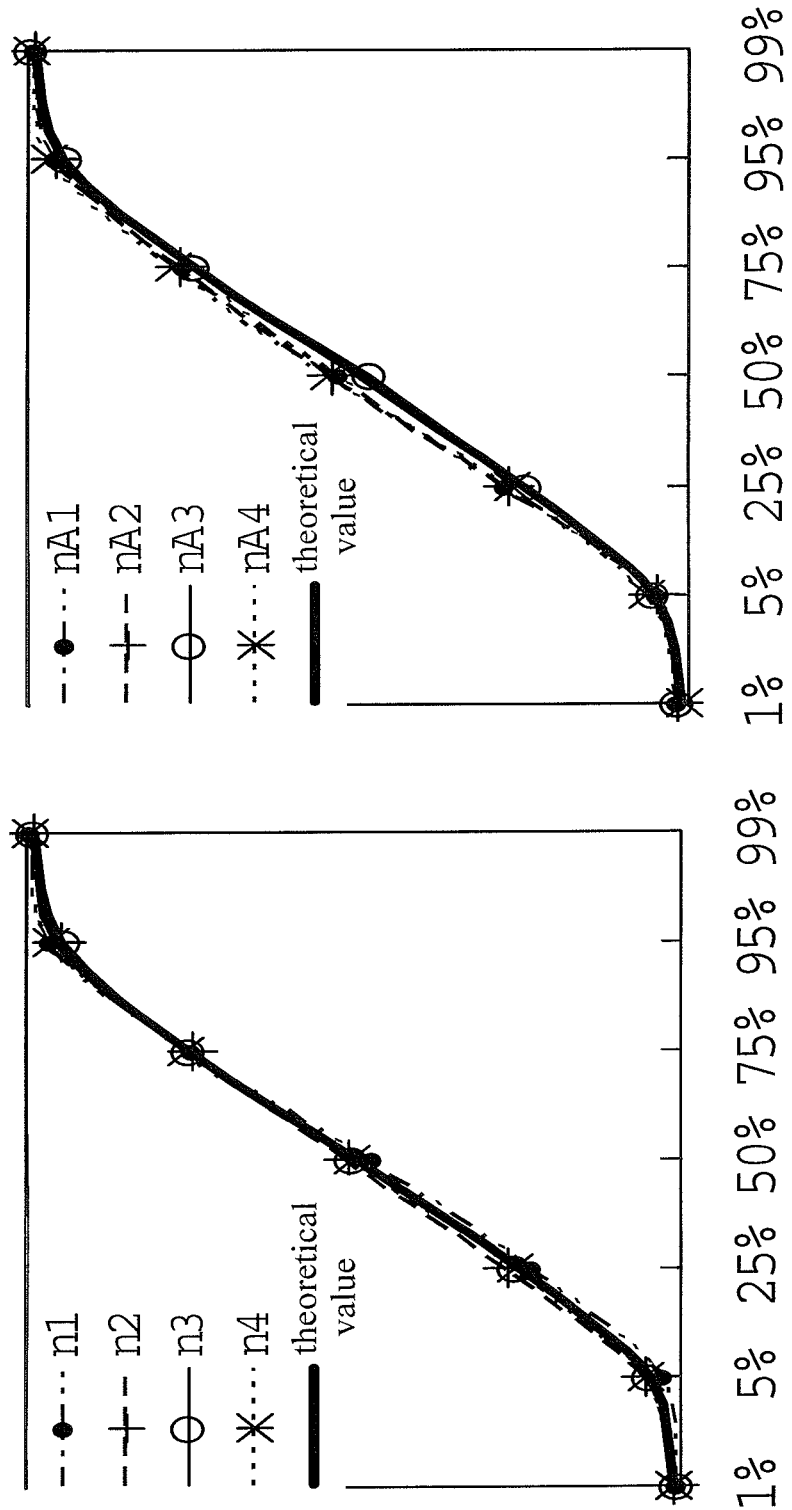
FIG. 9 is a graph to show result of equi-distribution test in accordance with the present invention.

A random number register 112 is used for saving random number with N bits outputted from the mixing output unit. A control unit for generating random number 114 is used for controlling the initial value transformation unit 104, the chaos computing unit 108 and the mixing output unit 110 to generate the random number. FIG. 8 is a flowchart to show operation of the random number generator 100 in accordance with the present invention. Set binary sequence having N bits as initial value (s102). Then, transform the binary sequence having N bits into integer a of $2^m$ carry number having [((N−1)/m)]+1 digits (s104). For example, we can suppose N=128 bits and m=32 bits in order to be adapted to the practical hardware design. Then, save a in the register (s106). Then, the chaos computing unit sets the integer a saved in the register as input value to perform the calculating of the equation (1) (s108). Accordingly, the mixing output unit utilizes fore-N bits (d1) of the calculation result with 2N bits to save in the register.

Perform the excluding logical calculation between the fore-N bits of d (d1) and the back-N bits of d (d2) (s110). Accordingly, a random number register saves the random number with N bits (output random number r)(s112). Then, the operational steps (as shown in the flowchart) end. If the random number has to be generated continuously, the steps between s108-s112 have to be performed repeatedly.

The random number generated from the random number generator while the computing precision N equaling 128 bits, is performed by seven tests. Because the output random number obtained from the random number generator is a binary sequence test $\chi^2$ is adopted. $\chi^2$ distribution is an effective approximate value only when samples are great enough. However, when samples are greater, the partial regularity existing in the sequence may be hidden. Thus, we perform $\chi^2$ test with various quantities of samples.

The statistic test described above is performed with the random number r with 128 bits generated every time. Therefore, the possible regularity between every time of calculating can be hidden. Thus, with respect to the same test, we only obtain a sample data adopting method according to each time to calculate equation (1) and also can perform $\chi^2$ test.

$\chi^2$ test includes equi-distribution test, serial test, poker test, coupon collector's test, run test, birthday spacings test and so on. Each test is performed one thousand times. With respect to one thousand obtained values can be classified to seven intervals such as P<1%, 5%, 25%, 50%, 75%, 95%, 99% to compare with theoretical values. Moreover, it also includes serial correlation test. Serial test is calculated in 95% confidence interval.

Figure 10:
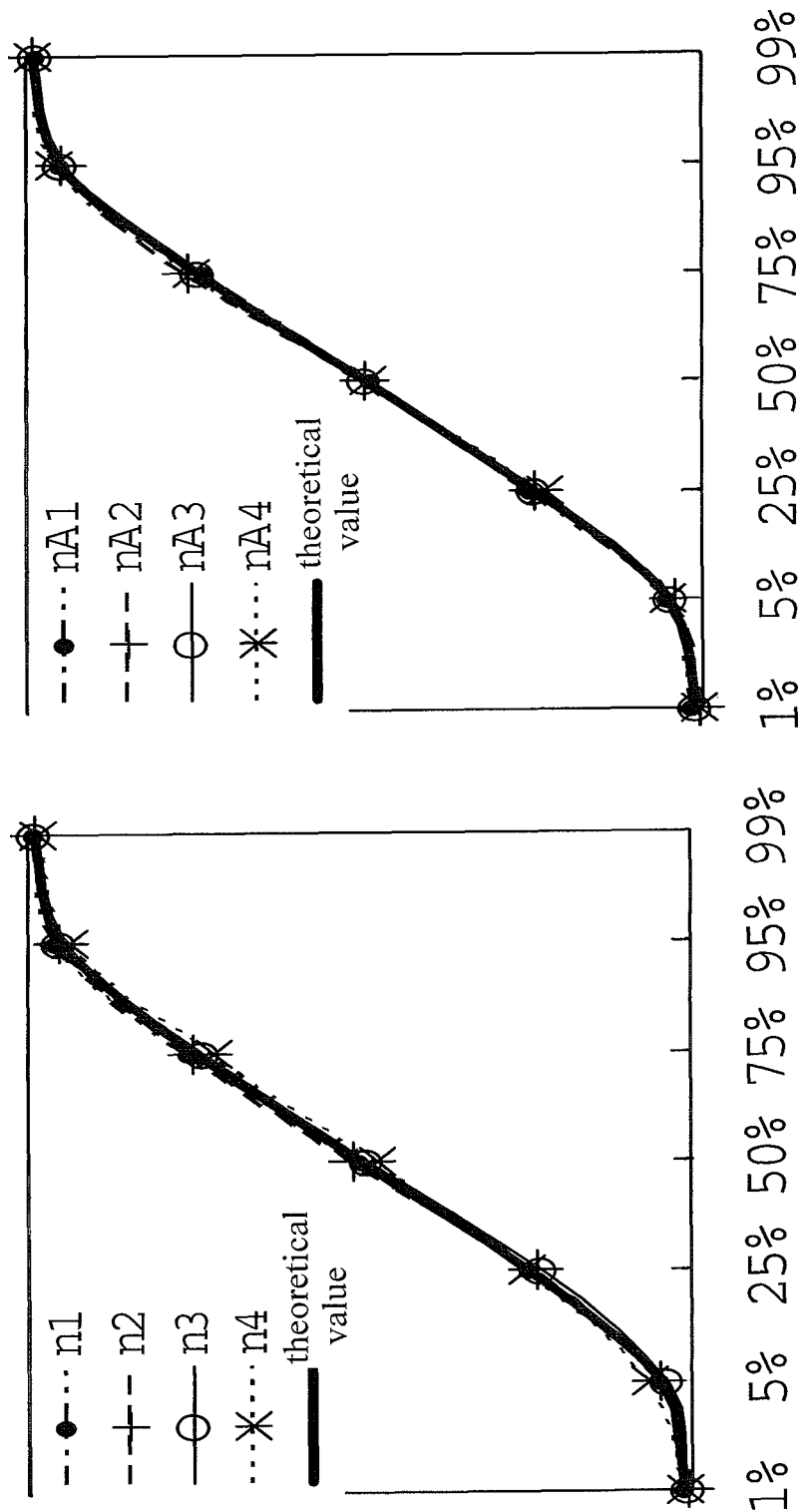
FIG. 10 is a graph to show result of serial test in accordance with the present invention.

With respect to the test of r with 128 bits, the result can be shown when selected samples are n1, n2, n3, n4. With respect to the fore-bits of r with 128 bits as one sample, the result can be shown when selected samples are nA1, nA2, nA3, nA4. Referring FIGS. 9 to 15, FIG. 9 is the result of the equi-distribution test when selecting integer with 8 bits as samples. Samples are four such as n1(nA1)=$2^{16}$, n2(nA2)=$2^{16}$×10, n3(nA3)=$2^{16}$×100, n4(nA4)=$2^{16}$×1000 revealing good results. FIG. 10 is the result of the serial test when selecting integer with 8 bits as samples. Samples are four such as n1(nA1)=$2^{20}$, n2(nA2)=$2^{20}$×10, n3(nA3)=$2^{20}$×100, n4 (nA4)=$2^{20}$×1000 revealing good results, too.

Figure 11:
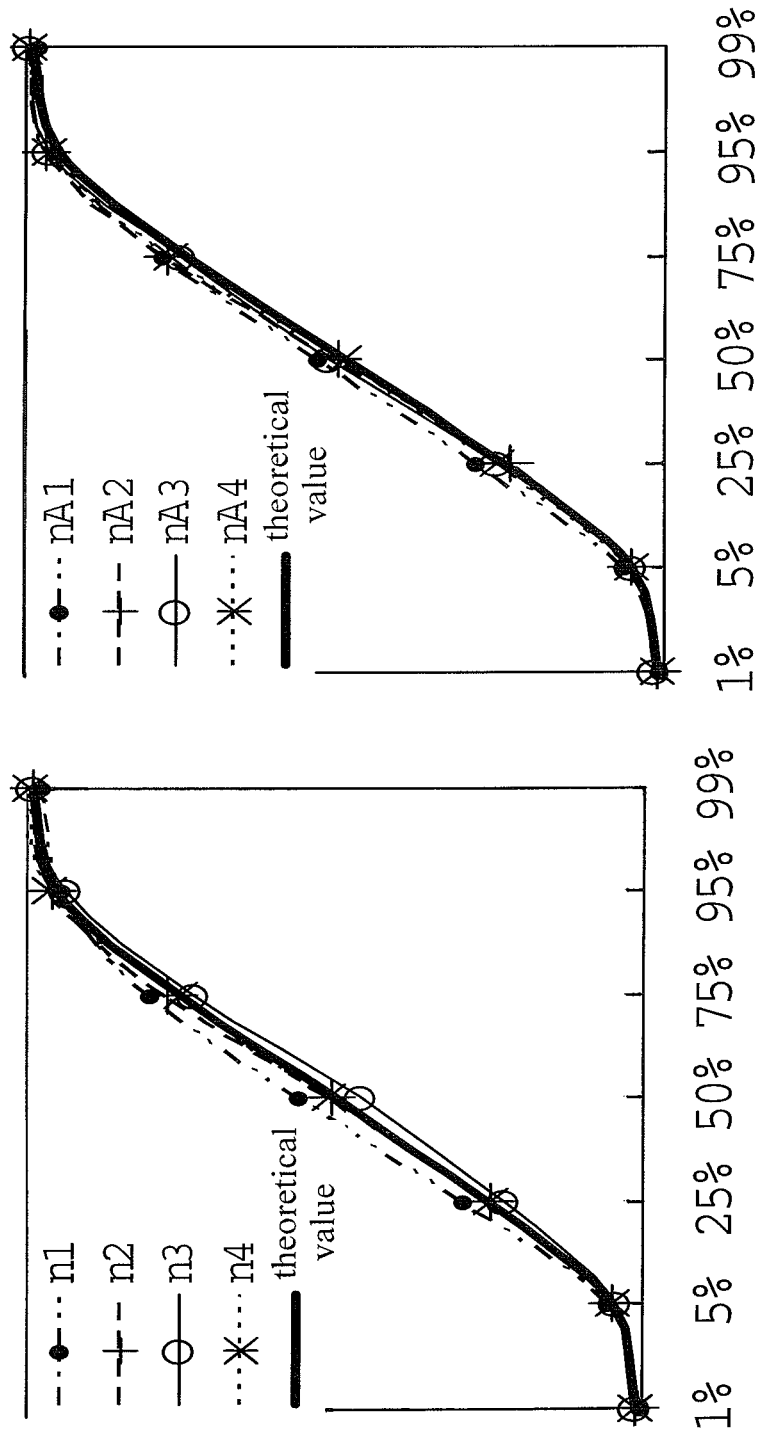
FIG. 11 is a graph to show result of poker test in accordance with the present invention.
Figure 12:
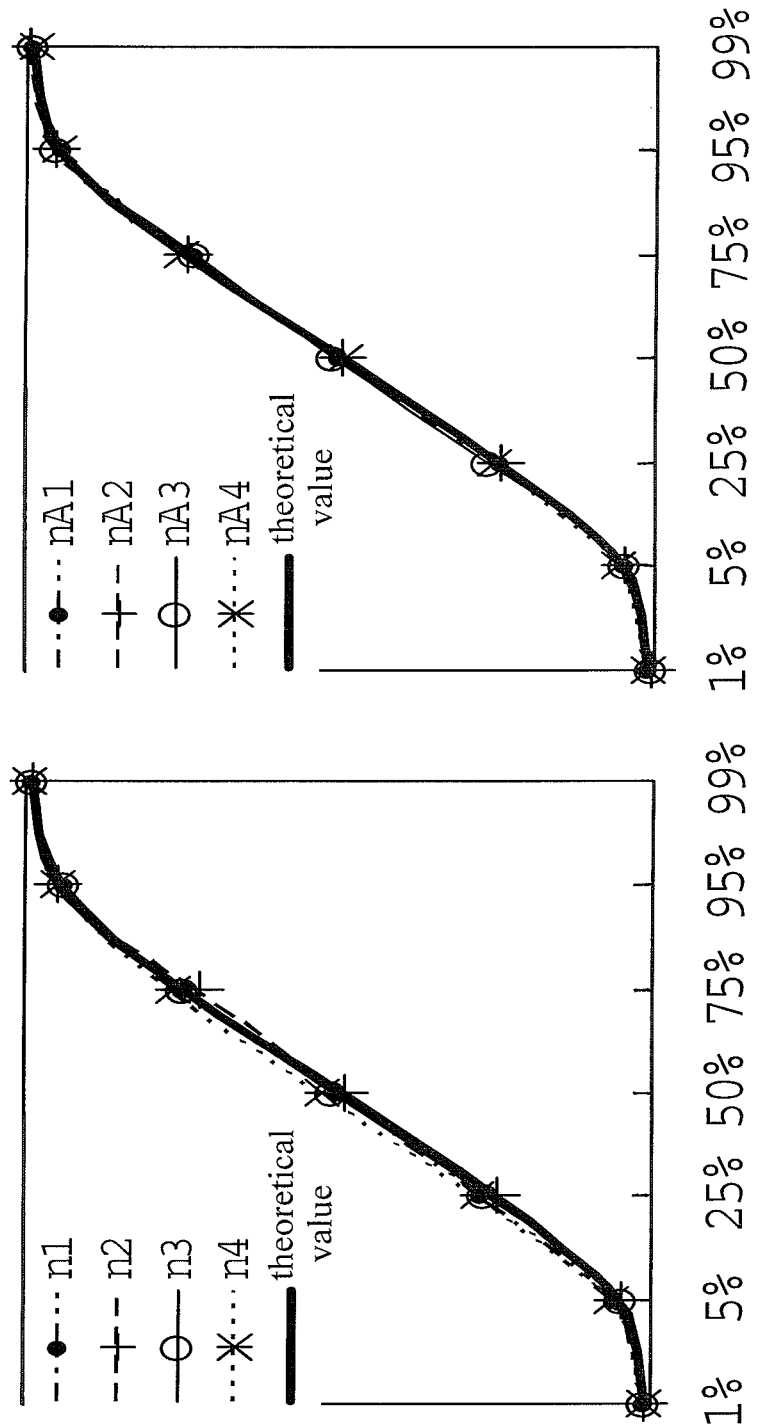
FIG. 12 is a graph to show result of coupon collector's test in accordance with the present invention.
Figure 13:
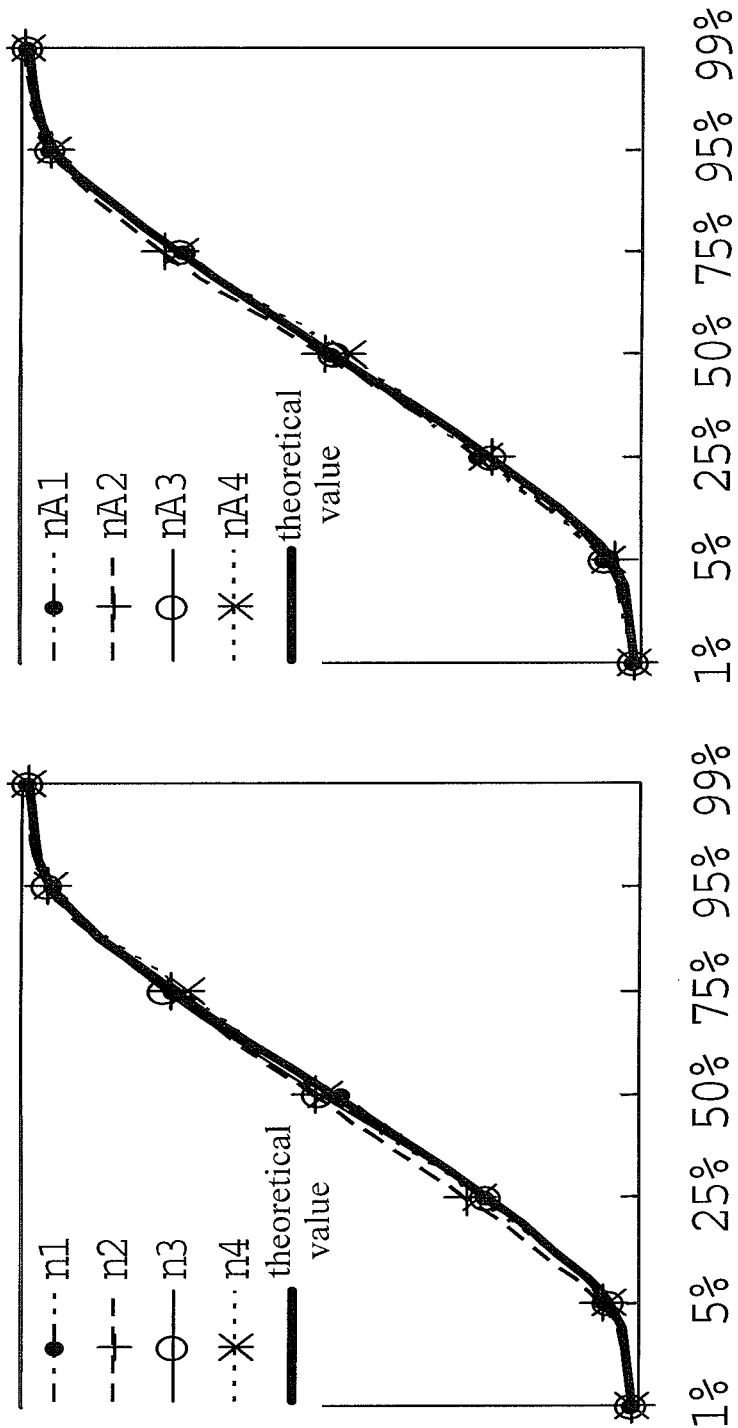
FIG. 13 is a graph to show result of run test in accordance with the present invention.

FIG. 11 is the result of the poker test when selecting integer with 3 bits as samples, dividing to five groups and setting the degrees of freedom as four. Samples are n1(nA1)=$2^{10}$, n2(nA2)=$2^{10}$×10, n3(nA3)=$2^{10}$×100, n4(nA4)=$2^{10}$×1000. When samples are n1(nA1)=$2^{10}$, the quantities of $\chi^2$ values in 1% interval is beyond 2%. However, when samples increase, the remaining three tests reveal good result. Therefore, we can suppose that it is because the samples are too less. FIG. 12 is the result of the coupon collector's test when setting the degrees of freedom as 30. Samples are n1(nA1)=$2^{10}$, n2 (nA2)=$2^{10}$×10, n3(nA3)=$2^{10}$×100, n4(nA4)=$2^{10}$×1000 revealing good result. FIG. 13 is the result of the Up run test when selecting integer with 32 bits as samples. Samples are n1(nA1)=$2^{16}$, n2(nA2)=$2^{16}$×10, n3(nA3)=$2^{16}$×100, n4 (nA4)=$2^{16}$×1000 revealing good result, too.

Figure 14:
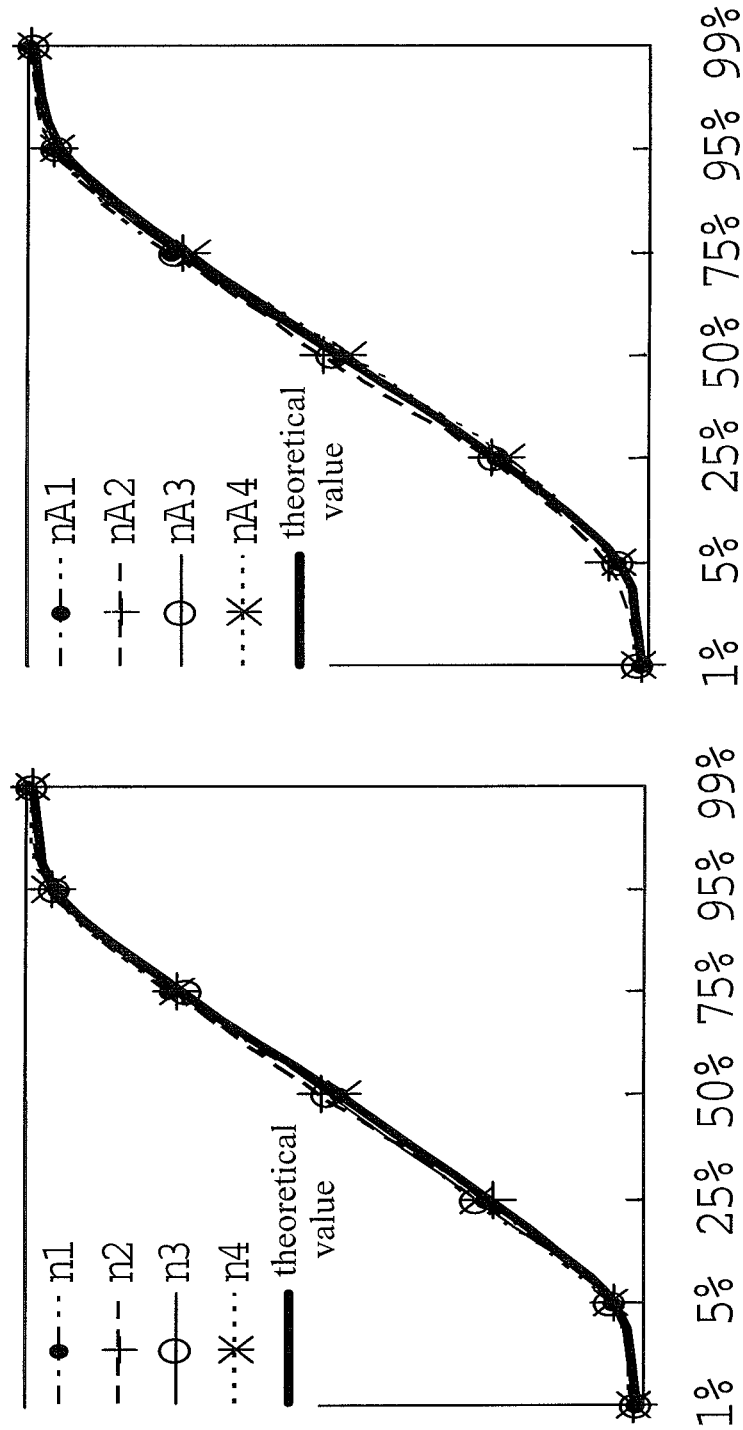
FIG. 14 is a graph to show result of birthday spacings test in accordance with the present invention.

FIG. 14 is the result of the Birthday spacing test when selecting integer with 25 bits as samples, setting reference number m=$2^{25}$, n=$2^9$ and setting the degrees of freedom as three. The sampling times are n1(nA1)=$10^3$, n2(nA2)=$10^4$, n3(nA3)=$10^5$, n4(nA4)=$10^6$ revealing good result, too. FIG. 15 is the result of the serial correlation test when selecting integer with 4 bits as samples. Samples are n1(nA1)=$2^{10}$, n2(nA2)=$2^{10}\times10$, n3(nA3)=$2^{10}\times100$, n4(nA4)=$2^{10}\times1000$, in 95% confidence interval, revealing good result, too (the quantities of the correlation coefficient c in one thousand tests are basically greater than 950 in the $\mu-2\sigma \leq c \leq \mu+2\sigma$). The results of strict tests described above reveal that the tested sequence has good characteristics of uniform distribution in statistics. The tests are described in the reference as follows: (Donald E. Knuth, "The Art of Computer Programming Vol. 2, Seminumerical Algorithms, Third Edition").

INDUSTRIAL APPLICABILITY

With respect to the present invention, a random number having a chaotic long cycle generated from a nonlinear function in high generating speed can be investigated by strict statistic tests. The random number can be widely used in various fields, such as computer simulation, sampling, numerical analysis, programming, decision-making, encryption, art, entertainment and so on.

In the present invention, with respect to generating the random number, we just utilize the integral calculation (such as multiplication, addition, shift, logical calculation and so on). Further, the integer can be easy to perform division calculating. Therefore, even in different computing systems (general computer (OS), Hardware circuit, micro computer). As long as performing basic integral calculating, it can be achieved that the same input value can obtain the same output value.

When the computing precision equals N bits in the present invention, each calculating of the equation (1) (mixing one time) can output a random number with N bits and having greatest complexity (N). The present invention solved the problem of the low generating speed due to expanded computing precision. The present invention achieved the goal of the high generating speed. The relation between computing precision and generating speed of random number can be shown in FIG. 16. It can achieve a high level result in the practical application. Due to the easy integral calculating for computer such as multiplication, addition, shift, logical calculation and etc, it can be very easy to implement to integrated circuit and have a higher generating speed for generating the random number.

The present invent is different from the conventional generating method which cannot be used for securing information safety. The present invention utilizes the chaos function to generate the random number and utilize excluding logical calculation with single direction to generate a partial random number r. Therefore, $x_t$ cannot be inferred and other random number cannot be inferred either. Thus, the random number generator proposed in present invention can meet various needs and have great expansion and can be used in scientific research, for securing information safety and in various industries.

While the invention herein disclosed has been described by means of specific embodiments, numerous modifications and variations could be made thereto by those skilled in the art without departing from the scope and spirit of the invention set forth in the claims.

The invention claimed is:

1. A random number generator utilizing integral calculation, comprising:
an initial value input unit for setting a binary integer having N bits (N≥2 and N is an integer) as an initial value;
an initial value transformation unit for transforming a binary sequence having N bits into an integer of $2^m$ carry number having [((N−1)/m)]+1 digits (m≥1 and m is an integer wherein [ ] is an operator used to round a part being after decimal point down) to utilize equation (1): $x_{t+1}=4x_t(1-x_t)$, (where $0<x_t<1$, t is a non-negative integer) for carrying out a fixed decimal point calculation;
a register used for saving data transformed from the initial value transformation unit and saving input data required for a repetitive calculation of a chaos computer with calculating precision of N bits;
a chaos computing unit for setting the integer of $2^m$ carry number having [((N−1)/m)]+1 digits as an input value to perform an integer division calculation and have a calculation result with 2N bits;
a mixing output unit for utilizing fore-N bits of the calculation result with 2N bits of the chaos computing unit as an input value required for a repetitive calculation of the equation (1) and saved in the register, processing a one-to-one excluding logical calculation in predetermined bits of the calculation result with 2N bits, and utilizing the calculation result with N bits as an output random number;
a random number register for saving the output random number with N bits outputted from the mixing output unit; and
a control unit for generating a random number used for controlling the initial value transformation unit, the chaos computing unit, and the mixing output unit to generate another random number;
wherein influenced bits of a binary sequence d ($d_0 d_1 \ldots d_{2N-1}$) with 2N bits as a calculation result of an input value a ($a_0 a_1 \ldots a_{N-1}$) of the chaos computing unit are different in a calculating process of the chaos computing unit and have a non-uniform distribution characteristic; the mixing output unit performs a one-to-one excluding logical calculation and an XOR calculation in predetermined bits of the ($d_0 d_1 \ldots d_{2N-1}$) to generate a random number $r_i$ (i=0, 1, . . . N−1); each bit of the random number $r_i$ (i=0, 1, . . . N−1) is influenced by the input value a in a different form; and in the ($d_0 d_1 \ldots d_{2N-1}$) between $d_i$ and $d_{i+N}$ (i=0, 1, . . . N−1) a one-to-one excluding logical calculation ($r_i = d_i \{\text{circumflex over (+)}\} d_{i+N}$) is performed, wherein the binary sequence d ($d_0 d_1 \ldots d_{2N-1}$) and the input value a ($a_0 a_1 \ldots a_{N-1}$) has a predetermined relationship therebetween to generate the random number $r_1$ with the highest complexity.

2. A random number generating method utilizing integral calculation according to equation (1): $x_{t+1}=4x_t(1-x_t)$, where $0<x_t<1$, t is a non-negative integer, comprising:
setting a binary integer having N bits (N≥2 and N is an integer) as an initial value;
transforming a binary sequence having N bits into an integer of $2^m$ carry number having [((N−1)/m)]+1 digits (m≥1 and m is an integer wherein [ ] is an operator used to round a part being after decimal point down);
inputting to a chaos computing unit having a calculating precision with N bits and a calculation result with 2N bits;
utilizing the chaos computing unit to perform the equation (1) for an input value a ($a_0 a_1 \ldots a_{N-1}$) to perform a fixed decimal point calculation to generate a binary sequence d ($d_0 d_1 \ldots d_{2N-1}$) with 2N bits; the chaos computing unit means a computer having $2^m$ bits calculating capability including multiplication, addition, shift, and logical calculation capability between bits; the chaos computing unit utilizing an integer with N bits to divide into the integer of $2^m$ carry number having $[((N-1)/m)]+1$ digits; and utilizing the equation (1) to perform an integer division calculation; and setting fore-N bits of a result with 2N bits d ($d_0 d_1 \ldots d_{2N-1}$) calculated by the chaos computing unit as the input value a ($a_0 a_1 \ldots a_{N-1}$) required for a repetitive calculation of the equation (1);

wherein influenced bits of the binary sequence d ($d_0 d_1 \ldots d_{2N-1}$) with 2N bits as a calculation result of an input value a ($a_0 a_1 \ldots a_{N-1}$) of the chaos computing unit are different in a calculating process of the chaos computing unit and have a non-uniform distribution characteristic, each bit of the d (($d_0 d_1 \ldots d_{2N-1}$) with 2N bits performs a one-to-one excluding logical calculation between predetermined bits to generate a random number with N bits r ($r_0 r_1 \ldots r_{N-1}$);

wherein the chaos computing unit performs a one-to-one excluding logical calculation and an XOR calculation in predetermined bits of the d ($d_0 d_1 \ldots d_{2N-1}$) to generate a random number $r_i$ (i=0, 1, ... N−1); each bit of the random number $r_i$ (i=0, 1, ... N−1) is influenced by the input value a in a different form; and in the d($d_0 d_1 \ldots d_{2N-1}$), between $d_i$ and $d_{i+N}$, (i=0, 1, ... N−1), a one-to-one excluding logical calculation ($r_i = d_i \{\text{circumflex over } (+)\} d_{i+N}$) is performed; and wherein the binary sequence d ($d_0 d_1 \ldots d_{2N-1}$) and the input value a ($a_0 a_1 \ldots a_{N-1}$) has a predetermined relationship therebetween to generate the random number $r_i$ with the highest complexity.

* * * * *